United States Patent [19]

Lo

[11] Patent Number: 4,831,689
[45] Date of Patent: May 23, 1989

[54] VERTICALLY SLIDABLY MOUNTED BRAKE FOR A RESILIENTLY SUPPORTED CASTER WHEEL

[76] Inventor: Justin Lo, P.O. Box 46-408, Taipei, Taiwan

[21] Appl. No.: 197,657

[22] Filed: May 23, 1988

[51] Int. Cl.⁴ .............................................. B60B 33/02
[52] U.S. Cl. ...................................... 16/35 R; 16/44; 280/47.38; 280/658
[58] Field of Search .............. 10/35 R, 44; 280/47.11, 280/47.38, 658

[56] References Cited

U.S. PATENT DOCUMENTS 4,575,896  3/1986  Nakao et al. ........................ 16/44 X
4,608,729  9/1986  Huang ................................. 16/44 X Primary Examiner—Fred A. Silverberg
Attorney, Agent, or Firm—Bernard R. Gans

[57] ABSTRACT

A wheel fixing device for a wheel assembly of a baby carriage including:
a hollow shaft element at the extream end of the shaft;
a rotatable seat rotatable with respect to the wheel assembly being rotatably connected with a lower part of the hollow shaft element; the rotatable seat having a pair of knobs;
a hub body joining said rotatable seat and a pair of wheels of the wheel assembly; and
a slidable housing comprising:
 a central recess for encompassing the hollow shaft element and being vertically slidable along the hollow shaft element;
 a central slot on both sides thereof;
 a hole on both sides thereof;
 a spring member at both sides thereof with two legs extending in the same direction and with one leg thereof retained in the hole of the slidable housing and the other leg retained in respective hole of the hollow shaft element for securing the slidable housing and the hollow shaft element together and for imparting a desirable resiliency therewithin such that the slidable housing has a tendency to move downwards when the slidable housing is urged to a lower position;
 a pair of channel slots at corresponding front and rear surfaces thereof for rotatably the rotatable seat relative to said hollow shaft; said channel slots being complementary shaped with respect to the knobs for catching the knobs of the rotatable seat, and thereby making the rotatable seat non-rotatable.

8 Claims, 8 Drawing Sheets 4,831,689

VERTICALLY SLIDABLY MOUNTED BRAKE FOR A RESILIENTLY SUPPORTED CASTER WHEEL

BACKGROUND OF THE INVENTION

The present invention relates generally to wheel fixing device for baby carriage, and more particularly, to a wheel fixing device for baby carriage which is easily operable and comprises a vertically slidable housing being operable by hand or foot tip so as to fix the wheel assembly such that the carriage moves in unidirection, i.e., in forward or reversed direction only.

Heretofore, wheel assemblies for baby carriage, especially the front wheel assemblies, are fixable by fixing devices, wherein a groove is formed on a seat formed proximate to the wheel assembly, and a manually operable button piece is provided on the shaft. To fix the wheel assembly so that the carriage moves in such a straight line direction requires the groove and the button piece to be in precise alignment with each other so that the button piece can be trapped in the groove to thereby fix the wheel assembly.

Such conventional fixing device requires visual observation to check whether the groove and the button piece are in alignment with each other before fixing the wheel assembly and which is considered quite inconvenient in operation. Furthermore, the result of this conventional fixing device is also unsatisfactory. This is because, with the engagement of the button piece and the groove, the conventional fixing device provides only "single point" fixing effect; i.e., the wheel assembly is only fixed at one point. If the torsional force exerted on the wheel assembly is very large, the button piece would have torn. In addition, the wheel assembly may not be fixed very stably owing to the poor fixing effect of the conventional wheel fixing device.

The present invention has been arisen to mitigate and/or obviate the afore-described disadvantages of the conventional fixing device.

SUMMARY OF THE INVENTION

It is a primary object of the present invention to provide a wheel fixing device for baby carriage, in which the wheel assembly can be fixed without precise alignment of the groove and the fixing element of the device.

A further object of the present invention is to provide a wheel fixing device having a "two points" fixing effect such that the wheel assembly is fixed in a stable manner and that the carriage can move in such a steady straight line direction.

Another object of the present invention is to provide a wheel fixing device which includes a pair of sidewardly movable pieces at the both sides of the slidable housing for providing a better external feature and also for providing convenient assembly of the internal elements.

Further objects and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
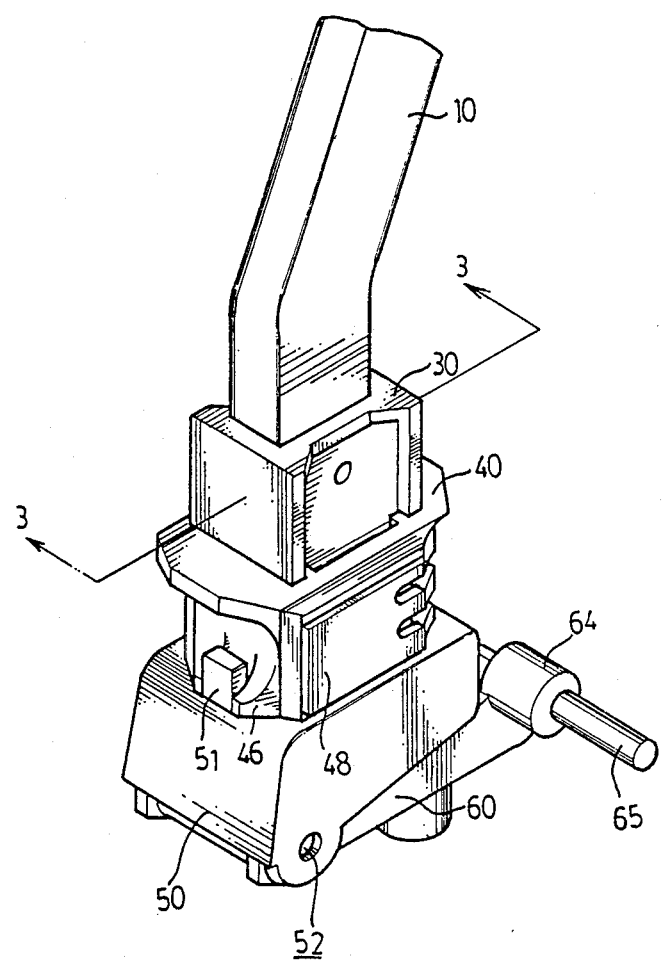
FIG. 1 is a perspective view of a wheel fixing device for baby carriage in accordance with the present invention.
Figure 8:
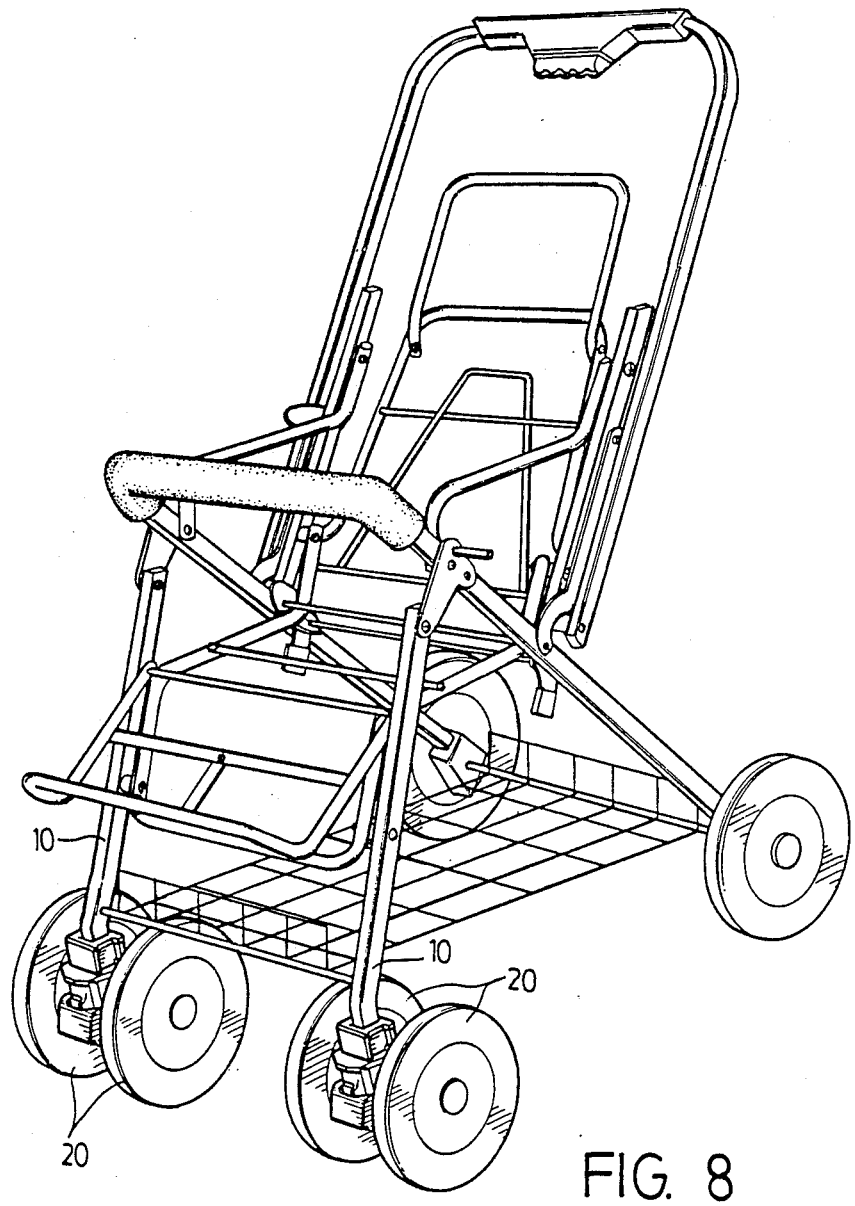
FIG. 8 is a view embodying the function of the wheel fixing device in a baby carriage.

Referring to the drawings and initially to FIG. 1, it can be seen that a wheel fixing device is formed on an extreme end of a shaft 10 proximate to a wheel assembly 20 of a baby carriage (see FIG. 8). The wheel fixing device constructed in accordance with the present invention comprises a hollow shaft element 30 adapted to be connected with an extreme end of the shaft 10, a vertically slidable housing 40, a rotatable seat 50 rotatable with respect to the wheel assembly 20, and a hub body 60 joining a pair of wheels of the wheel assembly 20.

Figure 2:
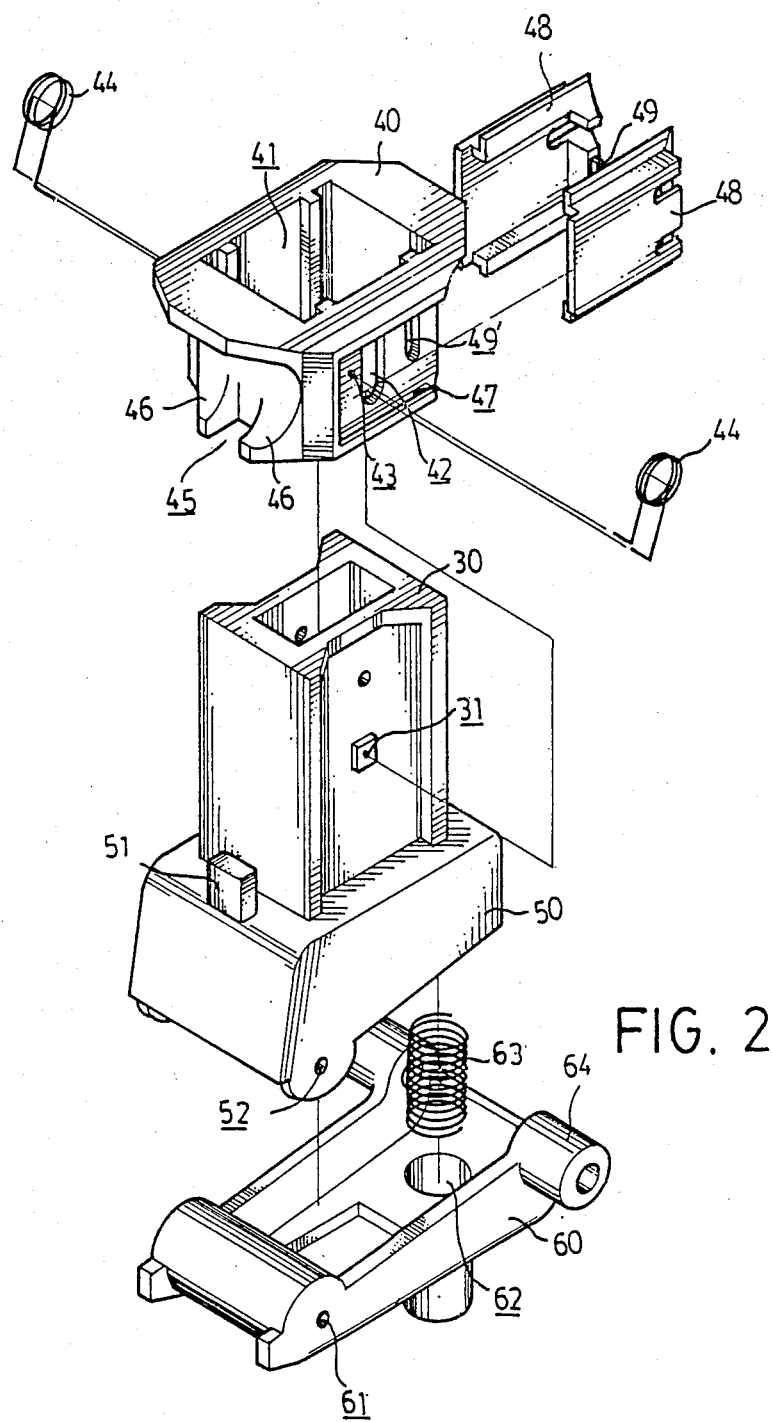
FIG. 2 is an exploded view of the wheel fixing device shown in FIG. 1.

A hole 31 is formed on a central part of both sides of the hollow shaft element 30, as depicted in FIG. 2.

Now, referring to FIG. 2, it can be seen that the slidable housing 40 includes a central recess 41 for encompassing the hollow shaft element 30. The slidable housing 40 is vertically slidable along the hollow shaft element 30.

Figure 6:
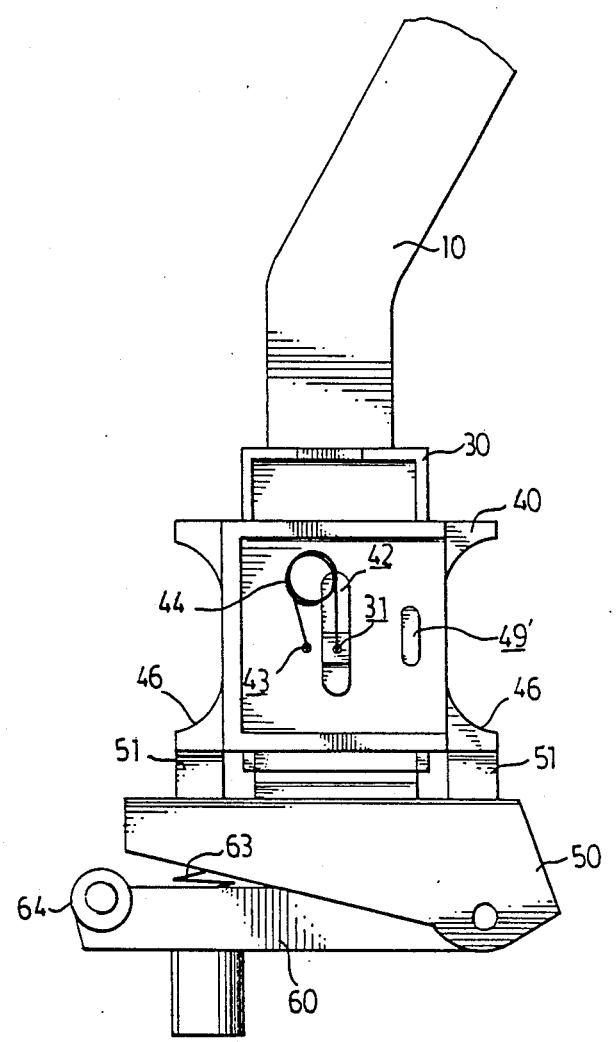
FIG. 6 is a working view of the wheel fixing device showing the slidable housing at a intermediate position with respect to the hollow shaft element.

A central slot 42 is formed on both sides of the slidable housing 40 and which is formed at a portion corresponding to the position of the central hole 31 of the hollow shaft element 30 after assembly. It should be noted that the position of the slidable housing 40 in relation with that of the hollow shaft element 40 is substantially restricted by the clearance of the slot 42. Therefore, it is preferable that the central slot 42 is formed in a sufficient length to facilitate the verticle sliding movement of the slidable housing 40 along the hollow shaft element for providing the fixing and releasing of the wheel assembly 20 which will be described in detail hereinbelow. A hole 43 is formed on both sides of the slidable housing 40 at a position proximate to said central slot 42 for receiving an end or a leg of a spring member 44. The other end or leg of the spring member 44 is inserted into a respective hole 31 of the hollow shaft element 30 through the central slot 42. The two spring members 44 are provided for securing the slidable housing 40 and the hollow shaft element 30 together after the slidable housing 40 has encompassed the hollow shaft element 30. The spring members 44, each of which has two ends or two legs extending in the same direction and with its one leg retained in hole 43 and the other leg retained in the hole 31, are provided also for imparting a desirable resiliency within the hollow shaft element 30 and the slidable housing 40 such that the slidable housing 40 will have a tendency to move downwards when it is urged to a position as shown in FIG. 6. The movement of the slidable housing 40 with respect to the hollow shaft element 30 will be described in detail hereinbelow.

The slidable housing 40 is provided with a pair of channel slots 45 at corresponding front and rear surfaces thereof for fixing the rotatable seat 50. In one preferred embodiment, the front and rear channel slots 45 are substantially in cubic shape and each of which is defined by a pair of walls 46 extending from the slidable housing 40. In one preferred embodiment, the walls 46 extending from the main body of the slidable housing 40 are flat at lower side and are arcuate at upper side. More preferably, the walls 46 are thicker at position nearer to the main body of the slidable housing 40 and are thinner at position away from the main body of the slidable housing 40.

The slidable housing 40 is flatten at both sides thereof and is respectively provided with grooves 47 on both sides for removably retaining two side pieces 48. The side pieces 48 are formed for the purpose of covering or hiding the internal elements of the slidable housing 40; i.e., for beautifying the external feature of the whole device. Although not limited thereto, it is preferable that the side pieces 48 include tenons 49 and the slidable housing 40 has corresponding mortises 49' such that the side pieces 48 are firmly combined with the slidable housing 40 with the tenons 49 lodged in the corresponding mortises 49' to prevent the side pieces 48 from detaching from the slidable housing 40.

The rotatable seat 50 includes a pair of knobs 51 which are adapted to be fixed in the channel slots 45 of the slidable housing 40. The knobs 51 are configured substantially in a shape and size in compliance with the shape of the channel slots 45. Preferably, the knobs 51 are substantially in cubic shape and are in the same size of the channel slots 45.

Figure 3:
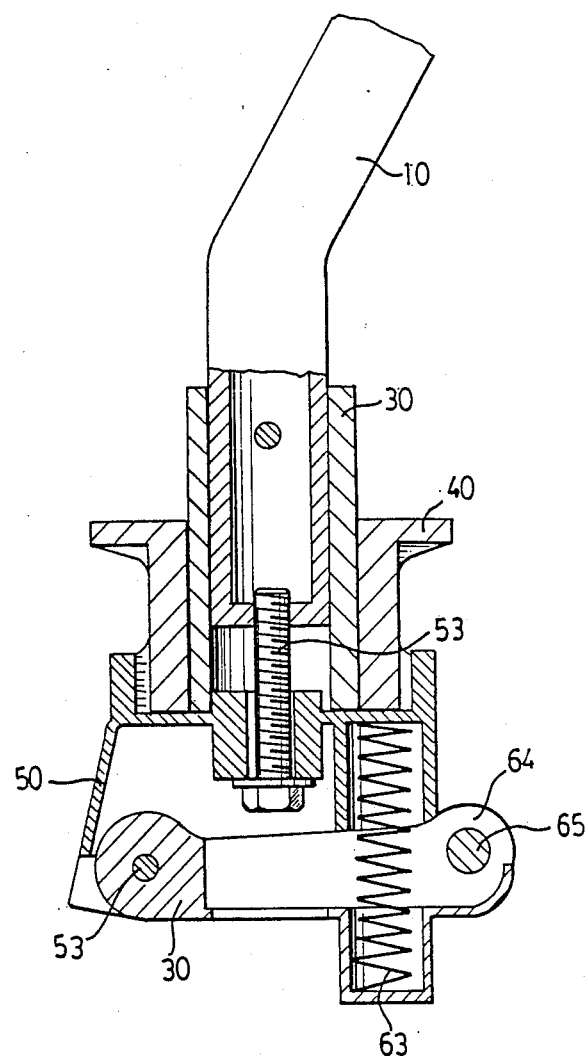
FIG. 3 is a sectional view of the wheel fixing device taken along line 3—3 of FIG. 1.

The front part of the rotatable seat 50 is provided with a pair of hinging holes 52 for hinging engagement with the hub body 60 through a hinging slot 61 of the hub body 60 with the aid of a hinging axle 53 (see FIG. 3). Although not limited thereto, it is preferable that the hub body 60 has a central recess s62 in which a coil spring 63 is retained. The position of the coil spring 63 after assembly can best be seen in the sectional view shown in FIG. 3. The coil spring 63 is provided for the purpose of providing suitable resiliency within the wheel assembly and the wheel fixing device so as to provide such kind of comfortable feeling for a baby in the baby carriage. The hub body 60 further includes a pair of tubes 64 for receiving an axle 65 which joins a pair of wheels of the wheel assembly 20 and which is known and requires no further description.

As has been mentioned previously, the slidable housing 40 is provided with spring members 44 for imparting suitable resiliency within the hollow shaft element 30 and the slidable housing 40 such that the slidable housing 40 can fix the rotatable seat 50 simultaneously when the channel slots 45 match with the knobs 51.

Referring to FIG. 3, it can be seen that the central part of the hollow shaft element 30 is combined with the extreme end of the shaft 10. The lower part of the hollow shaft element 30 is in turn combined with the rotatable seat 50. This is completed by a bolt 53.

Figure 4:
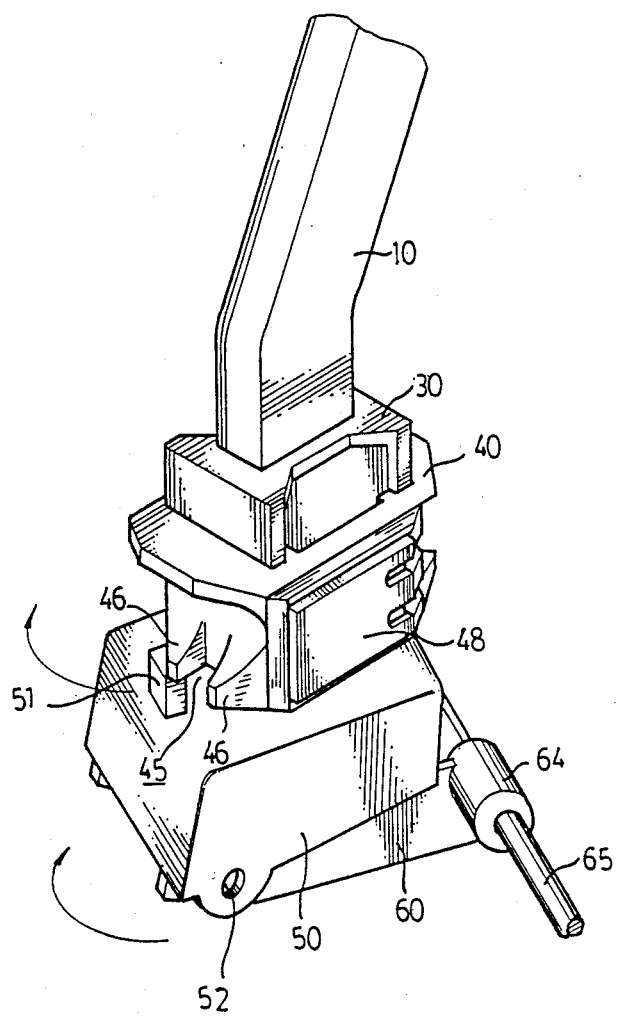
FIG. 4 is a schematic view of the wheel fixing device illustrating the automatic fixing of the wheel assembly.

With particular reference to FIG. 4, the manner in which the slidable housing 40 fixes the rotatable seat 50 even when in a biased position, i.e., the channel slots 45 of the slidable housing 40 are not in position with the knobs 51 of the rotatable seat 50, can be understood. When the vertically slidable housing 40 is being operated by hand or foot tip so as to move to a lower position with respect to the hollow shaft element 30, the slidable housing 40 has a tendency to move downward due to the spring force exerted by the spring members 44, as appreciated. When it is the case where the slidable housing 40 is in a biased position, or which has its channel slots 45 not in position with the knobs 51 of the rotatable seat 50, the channel slots 45 of the slidable housing 40 catch the knobs 51 of the rotatable seat 50 due to said tendency to move downward and thereby making the rotatable seat 50 non-rotatable as soon as the channel slots 45 have moved to a correct position with respect to or match with the knobs 51. It should be appreciated that the matching of the channel slots 45 and the knobs 51 is always ready to happen by a simple movement of the baby carriage.

Figure 5:
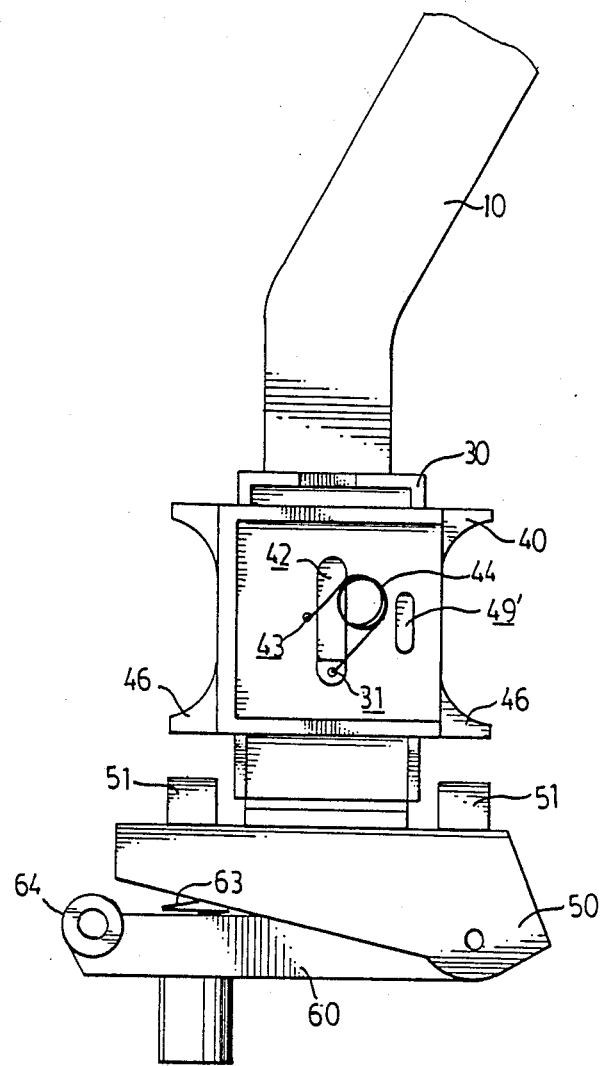
FIG. 5 is a working view of the wheel fixing device showing a slidable housing at an upper position with respect to a hollow shaft element.
Figure 7:
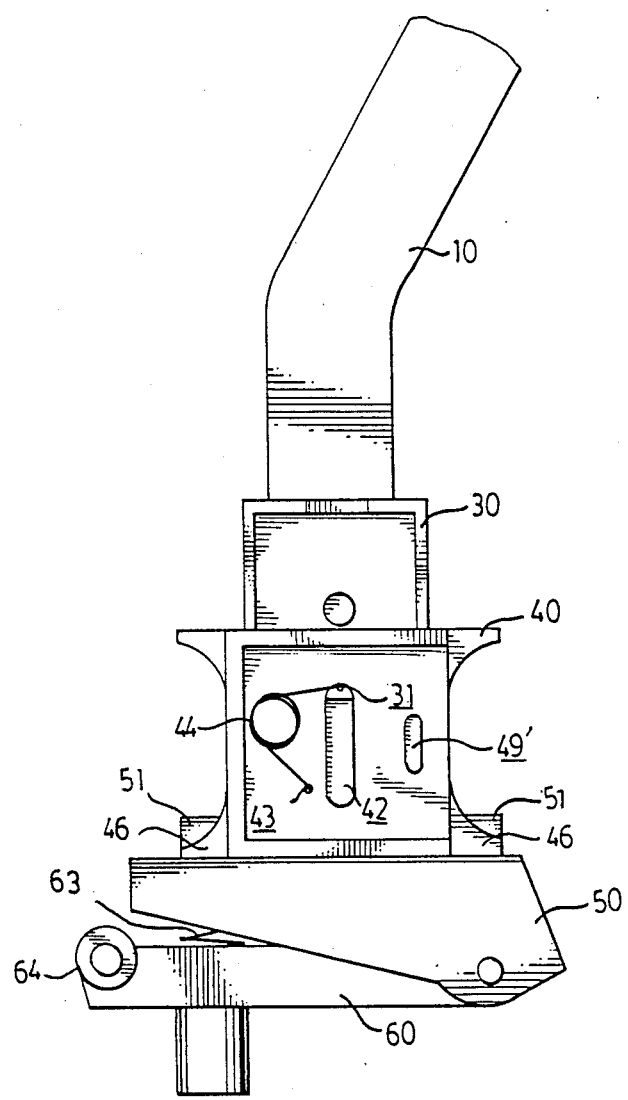
FIG. 7 is a working view of the wheel fixing device showing the slidable housing at a lower position with respect to the hollow shaft element.

The movement of the slidable housing 40 is depicted most clearly in FIGS. 5-7. As can be understood from the structure, the spring members 44 of the slidable housing 40 are in released position when in the situations shown in FIGS. 5 and 7. Therefore, the slidable housing 40 is in a static condition with respect to the hollow shaft element 30. When the slidable housing 40 is urged manually to a middle position as shown in FIG. 6, the spring members 46 are fully urged, in other words, the spring members 46 are at their critical elastic point, the slidable housing 40 thus slides automatically downwards to the lower position when it is not blocked by any object.

While the present invention has been explained in relation to its preferred embodiments, it is to be understood that various modifications or alterations thereof will become apparent to those skilled in the art upon reading this specification. Therefore, it is to be noted that all such modifications or alterations should be considered as fall within the scope of the appended claims.

I claim:

1. A wheel fixing device formed on an extreme end of a shaft proximate to a wheel assembly of a baby carriage comprising:

a hollow shaft element at a lower extreme end of said shaft comprising a hole on a central part of both sides thereof;

a rotatable seat rotatable with respect to said wheel assembly being rotatably connected with a lower part of said hollow shaft element; said rotatable seat having a pair of knobs;

a hub body joining said rotatable seat and a pair of wheels of said wheel assembly; and a slidable housing comprising:

a central recess for encompassing said hollow shaft element and being vertically slidable along the hollow shaft element;

a central slot on both sides thereof at a position corresponding to the position of a respective central hole of said hollow shaft element after assembly;

a hole on both sides thereof at a position proximate to the central slots;

a spring member at both sides thereof with two legs extending in the same direction and with one leg thereof retained in the hole of said slidable housing and the other leg retained in the hole of said hollow shaft element for securing said slidable housing and said hollow shaft element together and for imparting a desirable resiliency therewith such that said slidable housing has a tendency to move downwards when said slidable housing is urged to a lower position;

a pair of channel slots at corresponding front and rear surfaces thereof for rotatably fixing said rotatable seat relative to said hollow shaft; said channel slots being configured in a shape and size in compliance with the shape and size of said knobs for catching said knobs of said rotatable seat, and thereby making said rotatable seat non-rotatable.

2. A wheel fixing device as set forth in claim 1, wherein said pair of channel slots are substantially in cubic shape and each of which is defined by a pair of walls extending from the slidable housing.

3. A wheel fixing device as set forth in claim 2, wherein said walls extending from the main body of the slidable housing are flat at lower side and are arcuate at upper side and are thicker at position nearer to the main body of the slidable housing and are thinner at position away from the main body of the slidable housing.

4. A wheel fixing device as set forth in claim 1, wherein said slidable housing is flattened at both sides and is provided with grooves for removable retained two side pieces.

5. A wheel fixing device as set forth in claim 4, wherein said side pieces are provided with tenons and said slidable housing is provided with mortises such that the side pieces are firmly combined with the slidable housing.

6. A wheel fixing device as set forth in claim 1, wherein said hub body has a central recess in which a spring member is retained.

7. A wheel fixing device as set forth in claim 1, wherein a front part of said rotatable seat is provided with a pair of hinging holes for hinging engagement with said hub body through a hinging slot of said hub body with the aid of a hinging axle.

8. A wheel fixing device as set forth in claim 1, wherein said hub body has a central recess for retaining a spring member.

* * * * *